(12) United States Patent
Wakazono

(10) Patent No.: US 7,106,530 B2
(45) Date of Patent: Sep. 12, 2006

(54) OPTICAL SYSTEM HAVING IMAGE ROTATING FUNCTION, AND OPTICAL APPARATUS

(75) Inventor: Tsuyoshi Wakazono, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/076,184

(22) Filed: Mar. 9, 2005

(65) Prior Publication Data

US 2005/0207030 A1    Sep. 22, 2005

(30) Foreign Application Priority Data

Mar. 16, 2004    (JP)    ............... 2004-073751

(51) Int. Cl.
   *G02B 9/12*    (2006.01)
   *G02B 15/14*   (2006.01)
(52) U.S. Cl. .................. 359/784; 359/793; 359/689
(58) Field of Classification Search ........ 359/781–783, 359/793, 784, 676–692
   See application file for complete search history.

(56) References Cited

U.S. PATENT DOCUMENTS

| 3,536,381 A | 10/1970 | Pituley |
| 3,945,713 A | 3/1976 | Doi et al. |
| 5,347,391 A | 9/1994 | Cook et al. |
| 5,648,867 A * | 7/1997 | Hellriegel et al. .......... 359/362 |
| 5,920,428 A * | 7/1999 | Kim ........................... 359/432 |

FOREIGN PATENT DOCUMENTS

| JP | 50-34552 | 2/1993 |
| JP | 2002-14283 | 1/2002 |
| JP | 2002014283 | 1/2002 |

* cited by examiner

*Primary Examiner*—Scott J. Sugarman
*Assistant Examiner*—Darryl J. Collins
(74) *Attorney, Agent, or Firm*—Morgan & Finnegan, LLP

(57) ABSTRACT

Provided is an optical system having an image rotating function disposed on an image side with respect to an image pick up lens, which makes it possible that its optical performance is satisfactory, an eclipse amount is small, a field angle and an F number intended by a photographer are obtained, and compactness is achieved. The optical system is an optical system mountable to the image pick up lens. The optical system includes: an image rotator which is disposed on the image side with respect to a first imaging plane of the image pick up lens and has an incident optical axis and an emission optical axis made coaxial to each other; a first lens unit having a negative optical power which is disposed between the image pick up lens and the first imaging plane; a second lens unit having a positive optical power which is disposed between the first imaging plane and the image rotator; and a third lens unit having a positive optical power which is disposed on the image side with respect to the image rotator.

6 Claims, 13 Drawing Sheets

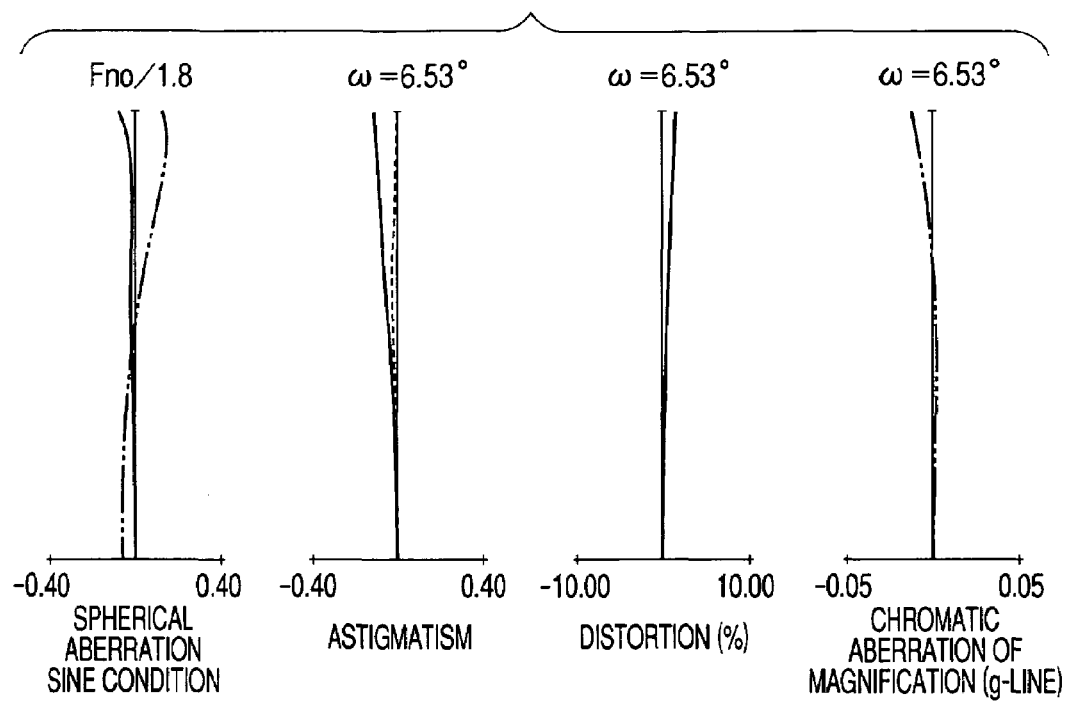
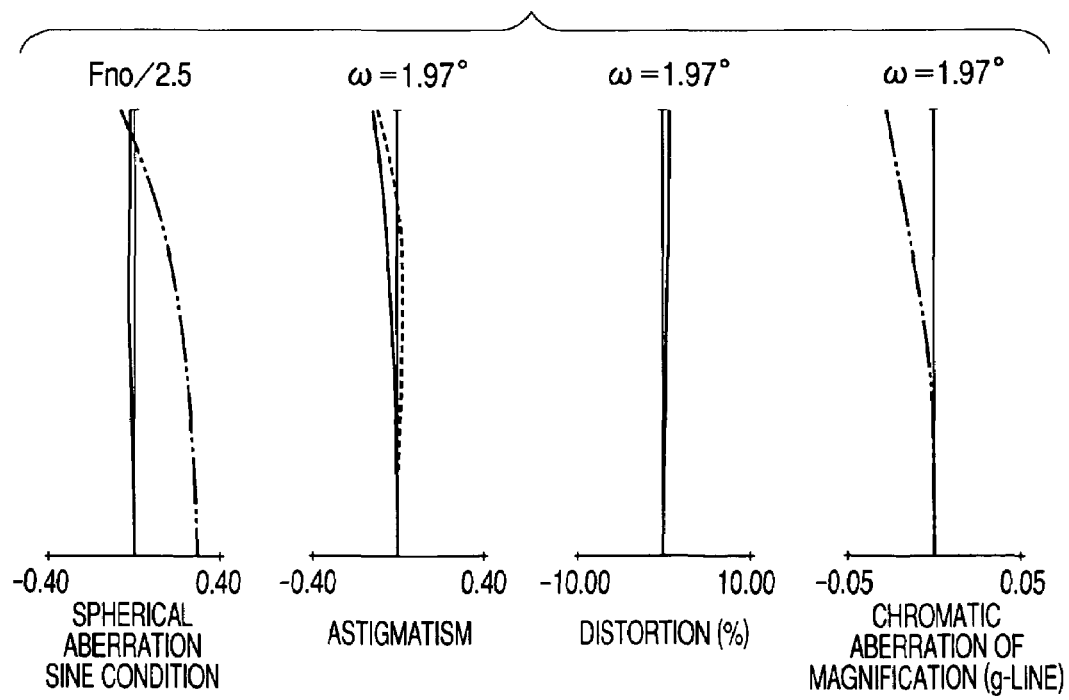

OPTICAL SYSTEM HAVING IMAGE ROTATING FUNCTION, AND OPTICAL APPARATUS

BACKGROUND OF THE INVENTION

1. Field of the Invention

The present invention relates to an optical system having an image rotating function, and more particularly to an optical system having an image rotating function mounted in an optical apparatus, such as a film camera, a television camera, or a video camera on an image side with respect to an image pick up lens thereof.

2. Related Background Art

As a means for rotating an image in an image pick up optical system or an observation optical system, there has been known a method of disposing an image rotator in an optical path of an optical system. The image rotator includes odd-numbered reflection surfaces and has an incident optical axis and an emission optical axis made coaxial to each other. When the image rotator is rotated with an optical axis of the image pick up optical system as a rotation axis by a predetermined angle, the image is rotated by twice the predetermined angle.

FIG. 20 is a conceptual diagram of such an image rotator. As a related art example where the image rotator is disposed in an observation optical system, Japanese Patent Application Laid-open No. 2002-014283 discloses an observation optical system in which an image rotator prism is disposed, and the image rotator prism is used to correct an image rotation accompanying a rotational movement of a rotating mirror.

Further, Japanese Patent Application Laid-open No. S50-034552 discloses an image pick up optical system provided with a relay optical system having an image rotator disposed on an image side with respect to an image pick up lens, and rotating a first image of the image pick up lens to effect reimaging.

When the above-mentioned image rotators are used, there is a demand to rotate an image in real time for achieving a special effect in photography. However, an image pick up lens to be used varies depending on photograph application, and may be a wide angle lens, a telescopic lens, a zoom lens, or the like. Therefore, to cope with the above demand, mounting an optical system having an image rotating function to an existing lens as an adapter results in high versatility and is more advantageous than the case where a specific lens is prepared for inserting an image rotator in an observation optical system as described in Japanese Patent Application Laid-open No. 2002-014283.

In addition, regarding an arrangement position of an optical system for image rotation in an image pick up optical system, to avoid an influence from change in viewing angle of an image pick up lens or change in viewing angle due to zooming, an image rotator is preferably disposed on an image side with respect to an image pick up lens as disclosed in Japanese Patent Application Laid-open No. 50-034552. At this time, it is preferable in practical use that degradation in optical performance of an image be small, a field angle and an F number intended by a photographer be obtained, quantity of light in periphery be secured, and the like. Furthermore, it is important for an entire apparatus to be compact from a practical standpoint.

Incidentally, in Japanese Patent Application No. S50-034552, a field lens is disposed on a first imaging plane of an image pick up lens, its optical power is appropriately controlled, and a pupil of a relay lens is set to be disposed in a vicinity of a center of an image rotator prism, thereby realizing the compact image rotator prism. However, according to such a structure, when an on-axis or off-axis marginal ray having high divergence characteristic enters the image rotator prism, there is a problem in that eclipse occurs in mid-course of an optical path within the image rotator. Therefore, the prism needs to be made large in order to avoid the eclipse, which is disadvantageous to produce a compact optical system.

Also, in Japanese Patent Application Laid-open No. S50-034552, the image rotator is constituted by a prism, and therefore there is a problem in that various kinds of aberration are generated in the image rotator, degrading its optical performance. When an attempt is made to correct the aberrations, a large number of lenses for correcting those aberrations are required, which is disadvantageous to produce the compact optical system.

SUMMARY OF THE INVENTION

In view of the above-mentioned problems, it is therefore an object of the present invention is to provide an optical system having an image rotating function disposed on an image side with respect to an image pick up lens, which makes it possible that its optical performance is satisfactory, an eclipse amount is small, a field angle and an F number intended by a photographer are satisfied, and compactness is achieved.

The present invention provides an optical system having an image rotating function configured as described below.

According to one aspect of the invention, an optical system mountable to an image pick up lens includes: an image rotator which is disposed on an image side with respect to a first imaging plane of the image pick up lens and has an incident optical axis and an emission optical axis made coaxial to each other; a first lens unit having a negative optical power which is disposed between the image pick up lens and the first imaging plane; a second lens unit having a positive optical power which is disposed between the first imaging plane and the image rotator; and a third lens unit having a positive optical power which is disposed on the image side with respect to the image rotator.

According to a further aspect of the invention, in the optical system, the following conditional expressions (1) and (2) are satisfied:

$$0.3 < |\phi_b/\phi_a| < 5.5 \qquad (1),$$

$$-0.3 < \beta_r < -0.9 \qquad (2),$$

where $\phi_a$ represents an optical power of the first lens unit, $\phi_b$ represents an optical power of the second lens unit, and $\beta_r$ represents an imaging magnification of an entirety of the optical system.

According to another aspect of the invention, an optical system mountable to an image pick up lens includes: an image rotator which is disposed on an image side with respect to the image pick up lens and has an incident optical axis and an emission optical axis made coaxial to each other; a first lens unit having a negative optical power which is disposed between the image pick up lens and the image rotator; and a second lens unit having a positive optical power which is disposed on the image side with respect to the image rotator.

According to a further aspect of the invention, in the optical system, the following conditional expressions (3) and (4) are satisfied:

$$0.75<|\phi_d/\phi_c|<1.2 \quad (3),$$

$$1.2<\beta_s<3.0 \quad (4),$$

where $\phi_c$ represents an optical power of the first lens unit, $\phi_d$ represents an optical power of the second lens unit, $\beta_s$ represents an imaging magnification of an entirety of the optical system.

According to a further aspect of the invention, in the optical system, the image rotator is constituted by mirror reflection surfaces.

According to another aspect of the invention, an optical apparatus includes: an image pick up lens; an image pick up camera; and the optical system set out in the foregoing which is disposed between the image pick up lens and the image pick up camera.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a longitudinal aberration diagram in the case of f=48 mm and the object distance of 3.0 m according to the second numerical embodiment;

FIG. 13 is a longitudinal aberration diagram in the case of f=160 mm and the object distance of 3.0 m according to the second numerical embodiment;

DETAILED DESCRIPTION OF THE PREFERRED EMBODIMENTS

Hereinafter, a description will be given with respect to aspect of embodiment of the present invention.

[Aspect of First Embodiment]

Figure 1:
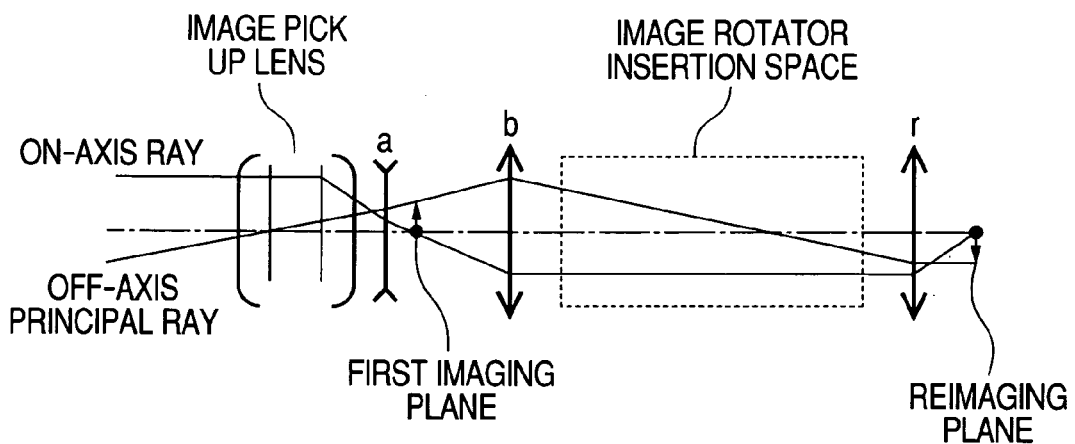
FIG. 1 is a conceptual diagram of an entire optical system upon mounting thereto an optical system, in which a first image is formed, having an image rotating function.

An optical system according to an aspect of first embodiment of the present invention is an optical system having an image rotating function, and an appropriate optical power arrangement is defined in the optical system so that a first image formed by an image pick up lens is relayed and reimaging is effected. With this structure, it is possible to realize the compact optical system having the image rotating function, whose eclipse amount is small and optical performance is satisfactory. FIG. 1 is a conceptual diagram of the entire optical system of an aspect of first embodiment. To facilitate the description, an image rotator is developed based on an optical path.

In FIG. 1, symbol a denotes a first lens unit having a negative optical power, which is disposed on the object side with respect to a first imaging plane of the image pick up lens. Symbol b denotes a second lens unit having a positive optical power, which is disposed between the image pick up lens and the image rotator. Symbol r denotes a third lens unit, which is disposed between the image rotator and a reimaging plane.

In general, since an on-axis or off-axis marginal ray after the first imaging plane has large divergence characteristic in an image pick up lens having a large aperture ratio, the entire apparatus needs to be enlarged in order to propagate all beams collectively. To solve this problem, as shown in FIG. 1, the first lens unit a having a negative optical power is disposed on the object side with respect to the first imaging plane of the image pick up lens, whereby the divergence characteristic of the on-axis or off-axis marginal ray is suppressed.

Also, the optical system having the image rotating function has a positive optical power as the entire system, and an optical power on a convergence plane becomes high. Therefore the Petzval sum is positive based on the following Petzval sum expression (5), $$P_{sum} = \sum_{j=1}^{k} \left[ \frac{-1}{r_j} \Delta\left(\frac{1}{n_j}\right) \right], \quad (5)$$

$$\therefore \Delta\left(\frac{1}{n_j}\right) = \frac{1}{n'_j} - \frac{1}{n_j}$$

where $P_{sum}$ represents Petzval sum, r represents curvature radius, n represents refractive index before entering medium, and n' represents refractive index of medium.

When the Petzval sum increases in positive, a negative field curvature and astigmatism are generated, degrading the optical performance. Herein, the first lens unit a having a negative optical power is disposed in a vicinity of an imaging plane, which enhances the negative optical power, whereby the value of Petzval sum is lowered.

On the other hand, the second lens unit b having a positive optical power is disposed between the first imaging plane and the image rotator. Thus, the divergence characteristic of the on-axis marginal ray is further suppressed, and at the same time a height of an off-axis principal ray diverged from the first lens unit a is suppressed. Symbol r denotes a positive lens unit for reimaging after the ray exits the image rotator.

The conditional expression (1) described above regulates appropriate values for an optical power $\phi_a$ of the first lens unit a having a negative optical power and an optical power $\phi_b$ of the second lens unit b having a positive optical power. If the value $|\phi_b/\phi_a|$ is not greater than the lowest limit of the conditional expression (1), the divergence characteristic of the on-axis or off-axis marginal ray can be suppressed but the off-axis principal ray diverges. As a result, the height of the off-axis ray entering the image rotator becomes large, and the image rotator needs to be made large to coverage the off-axis ray.

On the other hand, if the value $|\phi_b/\phi_a|$ is not less than the largest limit of the conditional expression (1), the divergence characteristic of the on-axis marginal ray cannot be suppressed, and it is necessary to make the image rotator large to coverage the on-axis ray. Further, the optical power of the negative lens unit becomes small, and thus correction for the Petzval sum is not sufficient. Therefore, astigmatism and field curvature are generated in negative, degrading the optical performance.

The above-mentioned conditional expression (2) shows a limitation condition for an appropriate imaging magnification of the optical system having the image rotating function. Its sign, minus, implies that the image formed as a first image by the image pick up lens is subjected to be reimaged. In a first imaging type rear converter, if its imaging magnification is set not less than −0.9, an effective screen dimension is significantly reduced and eclipse occurs due to regulation from an effective diameter of the image pick up lens, which is not preferable.

On the other hand, if tele conversion is performed using a value less than the lowest limit of the conditional expression (2), this offers the same effect as that of an extender. Therefore, on-axis chromatic aberration and spherical aberration are significantly generated on a telescopic side, which is not preferable because correction therefor becomes difficult.

[Aspect of Second Embodiment]

In an optical system according to an aspect of second embodiment of the present invention, imaging magnification is positive, that is, the optical system is regulated in an appropriate optical power arrangement so that the first imaging is not caused but relay is performed. With this structure, it is possible to realize the compact optical system whose eclipse amount is small and optical performance is satisfactory.

Figure 2:
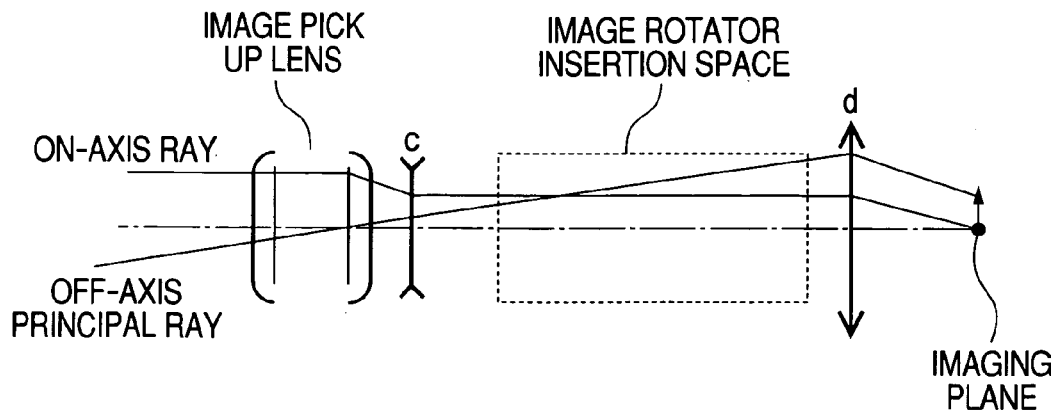
FIG. 2 is a conceptual diagram of an entire optical system upon mounting thereto an optical system, in which a first image is not formed, having an image rotating function.

FIG. 2 is a conceptual diagram showing an entire optical system according to an aspect of this embodiment. Similarly to FIG. 1, an image rotator is developed based on an optical path.

In FIG. 2, symbol c denotes a first lens unit having a negative optical power, which is disposed between an image pick up lens and the image rotator. Symbol d denotes a second lens unit having a positive optical power, which is disposed between the image rotator and an imaging plane.

When an optical system having an image rotating function without effecting the first imaging is mounted on a rear side of a bright image pick up lens, it is physically impossible to dispose the image rotator alone in an interval of a back focus of the image pick up lens because an optical path length of the image rotator is much longer than the back focus of the image pick up lens. Accordingly, the first lens unit c having a negative optical power needs to be disposed between the image pick up lens and the image rotator, the back focus needs to be elongated by suppressing convergent characteristic of an on-axis marginal ray. Then, the second lens unit d having a positive optical power is disposed between the image rotator and an imaging plane to control the imaging magnification and the back focus.

The above-mentioned conditional expression (3) regulates appropriate values for an optical power $\phi_c$ of the first lens unit c having a negative optical power and an optical power $\phi_d$ of the second lens unit d having a positive optical power. If the value $|\phi_d/\phi_c|$ is less than the lowest limit of the conditional expression (3), the optical power of the first lens unit c having a negative optical power is enhanced, and an off-axis principal ray diverges significantly. Therefore, for coverage of the off-axis ray within the image rotator, an apparatus needs to be made large. In addition, the off-axis principal ray diverges, whereby an exit pupil distance is shortened. In particular, white shading undesirably occurs in a television camera or the like which has a color separation optical system.

If the value $|\phi_d/\phi_c|$ is greater than the greatest limit of the conditional expression (3), the optical power of the first lens unit c having a negative optical power is lowered and a back focus is shortened. Thus, it is difficult to secure such an optical path length that the image rotator can be disposed.

The above-mentioned conditional expression (4) shows a limitation condition for an appropriate imaging magnification of the optical system having the image rotating function. Its sign, plus, implies that the first image is not formed by optical system having the image rotating function.

With reference to FIG. 2, comparing the back focus of the image pick up lens and the back focus of the optical system having the image rotating function each other, the back focus of the optical system having the image rotating function is shorter than the back focus of the image pick up lens by an interval between a principal point of the image pick up lens and a principal point of the lens unit c. If $\beta_s$ is less than the lowest limit of the conditional expression (4), a requisite back focus cannot be secured. Or the optical power of the negative lens unit c needs to be enhanced in order to secure the back focus, and the off-axis principal ray diverges. For coverage of the off-axis ray, it is necessary to make the image rotator large.

On the other hand, if tele conversion is performed with the value $\beta_s$ greater than the upper limit of the conditional expression (4), on-axis chromatic aberration and spherical aberration is significantly generated on the telescopic side and correction therefor is difficult.

[Aspect of Third Embodiment]

In an optical system according to an aspect of third embodiment of the present invention, an image rotator is constituted by mirror reflection surfaces, making it possible to attain satisfactory optical performance of an optical system having an image rotating optical system.

Subsequently, this will be further described. It is assumed that the image rotator is composed of a prism having a refractive index $N_{ir}$. In the case where an optical path development is performed while an optical path length of the image rotator is regarded as d, it is equivalent to a parallel plate having a refractive index, $N_{ir}$, and a thickness, d. In general, with insertion of a parallel plate, a generation amount of various kinds of aberration increases depending on the thickness d. When an attention is paid to on-axis chromatic aberration, upon mounting of the image rotator, an image point of the image pick up lens varies as shown in the following expression (6), $$\overrightarrow{PP'} = (1 - 1/N_{ir}) \cdot d \qquad (6),$$

where P represents image point of the image pick up lens, and P' represents image point after image rotator insertion.

As is apparent from the expression (6), a change in refractive index due to a wavelength change caused by a dispersion effect of the image rotator prism occurs, and on-axis chromatic aberration is generated. An optical path length within the image rotator is generally three times as long as a diameter of an incident beam, and on-axis chromatic aberration is significantly generated as is understood from the expression (6). When the image rotator is composed of mirrors, it is obvious that on-axis chromatic aberration is not generated because $N_{ir}=1$ in the expression (6). Further, since there is no refraction of a ray at boundary planes of an incidence and an exit surface of the image rotator, no other aberration occurs.

As has been described, optical performance degradation is avoided by composing the image rotator with mirrors, and high performance can be maintained even in the case of mounting the optical system having the image rotating function.

[Aspect of Fourth Embodiment]

According to an aspect of fourth embodiment of the present invention, a description will be given with respect to a configuration example of an image pick up lens which is applicable to the present invention.

Figure 3:
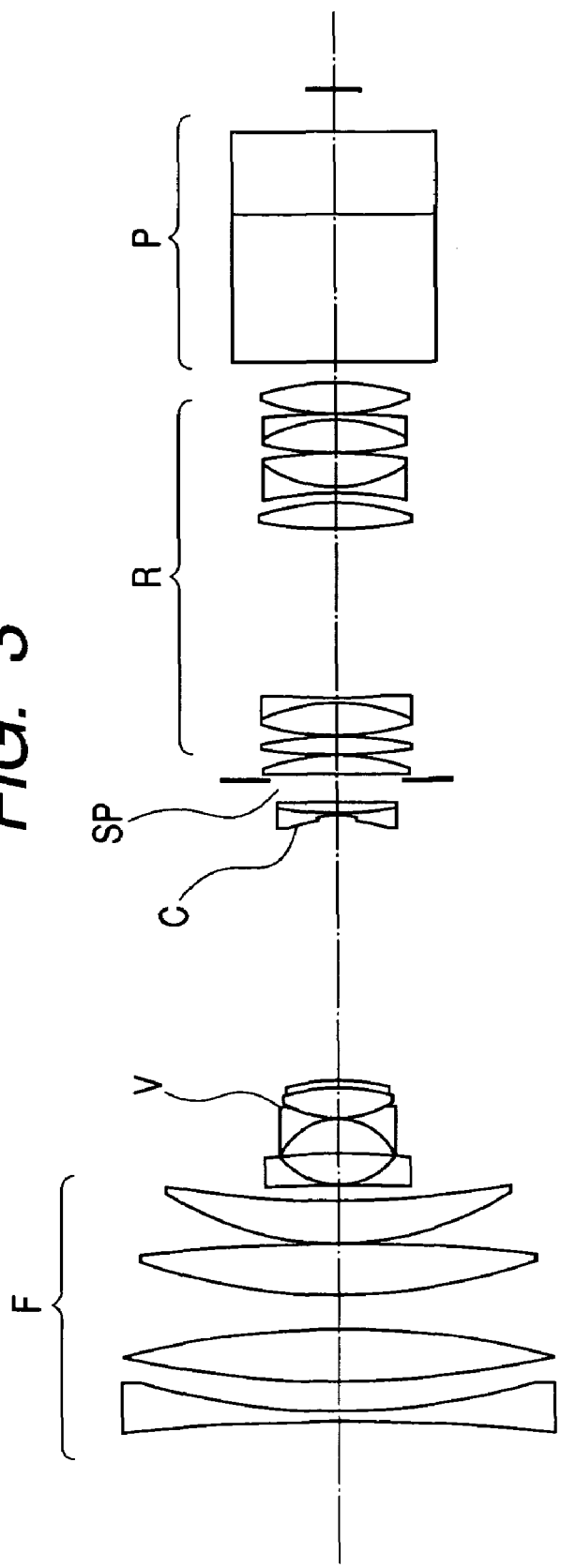
FIG. 3 is a cross-sectional view of an image pick up lens.

FIG. 3 is a cross-sectional view of an image pick up lens according to an aspect of this embodiment of the present invention.

In FIG. 3, symbol F denotes a front lens unit having a positive refractive power, which serves as a first unit. Symbol V denotes a variator having a negative refractive power for zooming, which serves as a second unit and moves along on an optical axis flatly to an image-plane side, thereby, conducting zooming from a wide-angle end to a telescopic end. Symbol C denotes a compensator having a negative refractive power, which serves as a third unit and moves on the optical axis in a non-linear manner having a locus convex to the object side in order to correct image plane fluctuation due to the zooming. The variator V and the compensator C constitute a zooming system.

Symbol SP denotes a stop and symbol R denotes a relay unit, which has a positive refractive power, is fixed at a position during zooming, and serves as a fourth unit. Symbol P denotes a color separation prism, an optical filter, or the like. In FIG. 3, symbol P denotes a glass block. The image pick up lens according to the aspect of this embodiment is a zoom lens composed of four lens units. However, for example, this may be a zoom lens composed of two lens units or a fixed focal length lens.

A numerical embodiment of the image pick up lens according to the aspect of this embodiment will be shown below.

[Numerical Embodiment of Image Pick up Lens according to the aspect of Fourth Embodiment]

TABLE 1 f = 8.0 to 160
FNO. = 1.8 to 2.5

| | | | | | | | |
|---|---|---|---|---|---|---|---|
| r 1 = | −398.617 | d 1 = | 2.00 | n 1 = | 1.81265 | ν1 = | 25.4 |
| r 2 = | 138.411 | d 2 = | 5.88 | | | | |
| r 3 = | 190.482 | d 3 = | 11.07 | n 2 = | 1.43985 | ν2 = | 95.0 |
| r 4 = | −158.221 | d 4 = | 6.95 | | | | |
| r 5 = | 104.571 | d 5 = | 10.45 | n 3 = | 1.62033 | ν3 = | 63.3 |
| r 6 = | −361.269 | d 6 = | 0.20 | | | | |
| r 7 = | 61.616 | d 7 = | 8.76 | n 4 = | 1.62033 | ν4 = | 63.3 |
| r 8 = | 240.012 | d 8 = | Variable | | | | |
| r 9 = | 623.406 | d 9 = | 0.80 | n 5 = | 1.88815 | ν5 = | 40.8 |
| r 10 = | 15.320 | d10 = | 5.99 | | | | |
| r 11 = | −120.427 | d11 = | 6.55 | n 6 = | 1.81264 | ν6 = | 25.4 |
| r 12 = | −13.787 | d12 = | 0.80 | n 7 = | 1.77621 | ν7 = | 49.6 |
| r 13 = | 31.762 | d13 = | 0.20 | | | | |
| r 14 = | 23.275 | d14 = | 4.97 | n 8 = | 1.57047 | ν8 = | 42.8 |
| r 15 = | −66.697 | d15 = | 1.11 | | | | |
| r 16 = | −28.678 | d16 = | 0.80 | n 9 = | 1.88815 | ν9 = | 40.8 |
| r 17 = | −58.591 | d17 = | Variable | | | | |
| r 18 = | −30.127 | d18 = | 0.80 | n10 = | 1.82017 | ν0 = | 46.6 |
| r 19 = | 69.206 | d19 = | 2.34 | n11 = | 1.93306 | ν11 = | 21.3 |
| r 20 = | −290.396 | d20 = | Variable | | | | |
| r 21 = | 0.000 (Stop) | d21 = | 1.30 | | | | |
| r 22 = | 766.570 | d22 = | 4.10 | n12 = | 1.62286 | ν12 = | 60.3 |
| r 23 = | −42.080 | d23 = | 0.15 | | | | |
| r 24 = | 148.919 | d24 = | 3.22 | n13 = | 1.52033 | ν13 = | 58.9 |
| r 25 = | −90.383 | d25 = | 0.15 | | | | |
| r 26 = | 61.396 | d26 = | 6.60 | n14 = | 1.52033 | ν14 = | 58.9 |
| r 27 = | −35.780 | d27 = | 1.15 | n15 = | 1.79012 | ν15 = | 44.2 |
| r 28 = | 698.727 | d28 = | 34.00 | | | | |
| r 29 = | 79.382 | d29 = | 5.22 | n16 = | 1.51825 | ν16 = | 64.1 |
| r 30 = | −47.920 | d30 = | 2.24 | | | | |
| r 31 = | −86.685 | d31 = | 1.15 | n17 = | 1.80401 | ν17 = | 42.2 |
| r 32 = | 25.952 | d32 = | 6.44 | n18 = | 1.52032 | ν18 = | 59.0 |
| r 33 = | −114.488 | d33 = | 0.15 | | | | |
| r 34 = | 59.870 | d34 = | 6.98 | n19 = | 1.48915 | ν19 = | 70.2 |
| r 35 = | −27.698 | d35 = | 1.15 | n20 = | 1.81078 | ν20 = | 40.9 |
| r 36 = | −219.881 | d36 = | 0.15 | | | | |
| r 37 = | 48.862 | d37 = | 5.74 | n21 = | 1.52032 | ν21 = | 59.0 |
| r 38 = | −55.798 | d38 = | 4.50 | | | | |
| r 39 = | 0.000 | d39 = | 30.00 | n22 = | 1.60718 | ν22 = | 38.0 |
| r 40 = | 0.000 | d40 = | 16.20 | n23 = | 1.51825 | ν23 = | 64.2 |
| r 41 = | 0.000 | | | | | | |

| Variable | Focal Distance | | | | |
|---|---|---|---|---|---|
| Interval | 8.00 | 16.92 | 48.00 | 115.20 | 160.0 |
| d 8 | 0.80 | 23.10 | 41.56 | 49.92 | 51.77 |
| d 17 | 53.41 | 27.52 | 6.51 | 3.44 | 6.19 |
| d 20 | 4.50 | 8.08 | 10.63 | 5.34 | 0.74 |

Next, embodiments of the present invention will be described.

[First Embodiment]

Figure 4:
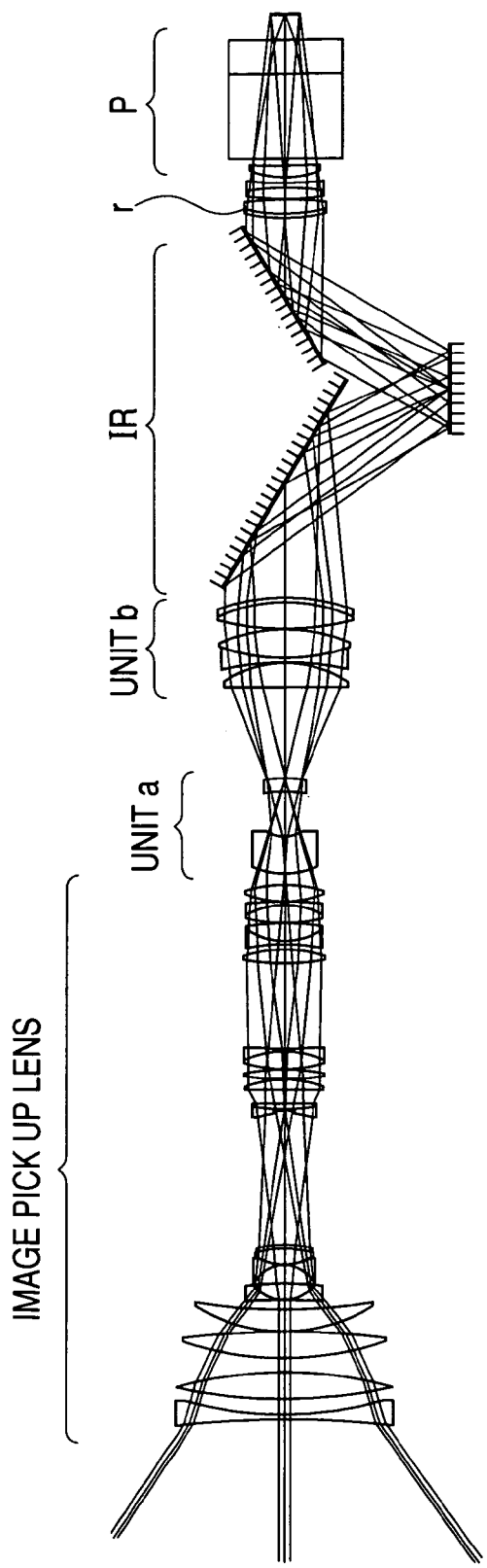
FIG. 4 shows optical paths in the state where an optical system having an image rotating mechanism is mounted to an image pick up lens according to a first embodiment of the present invention.

FIG. 4 shows optical paths in the state where an optical system having an image rotating mechanism is mounted to an image pick up lens according to a first embodiment of the present invention.

In FIG. 4, a lens unit a having a negative optical power is disposed between the image pick up lens and a first imaging plane. A lens unit b having a positive optical power is disposed on the image side with respect to the first imaging plane, and an image rotator IR composed of mirror reflection surfaces is disposed on the image side with respect to the lens unit b. In this embodiment, the image rotator is composed of three mirrors corresponding to the minimum number for making an incident optical axis and an emission optical axis coaxial to each other, but may be composed of odd-numbered surfaces equal to or more than three surfaces. Symbol r denotes an imaging lens having a function of reimaging an image relayed from the image pick up lens. A relationship between the respective conditional expressions described above and various values in numerical embodiments will be shown in Table 2. An interval between the image pick up lens and the optical system having the image rotating function is 4.48 mm. A first numerical embodiment of this embodiment will be shown below.

Figure 8:
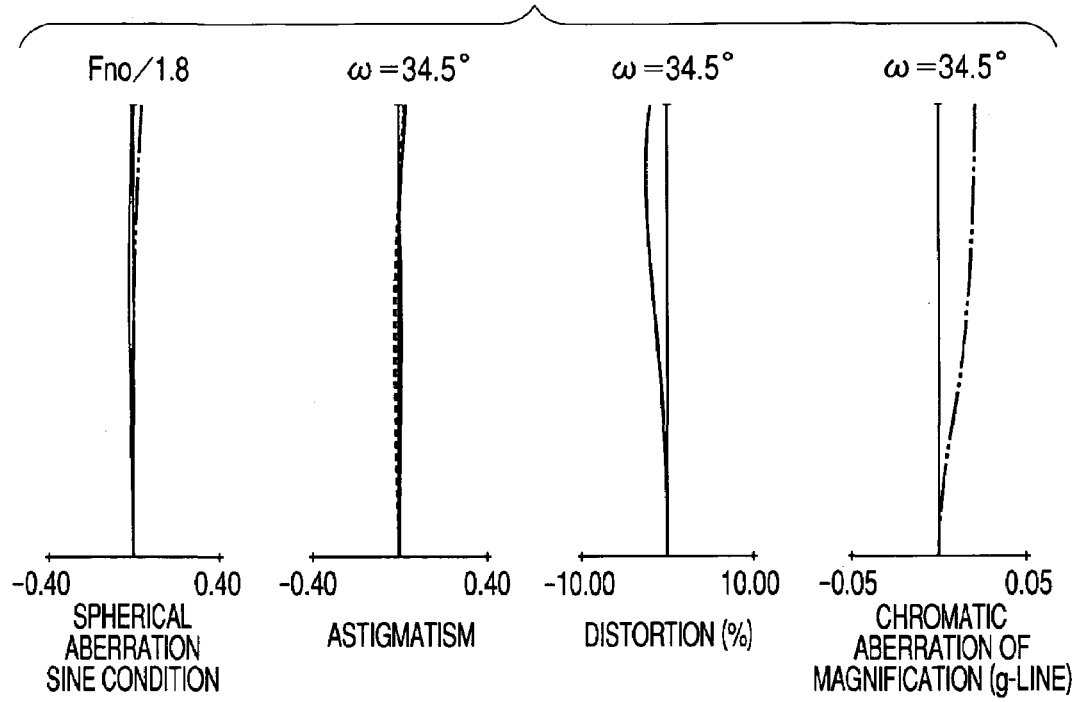
FIG. 8 is a longitudinal aberration diagram in the case of f=8.0 mm and an object distance of 3.0 m according to a first numerical embodiment.
Figure 9:
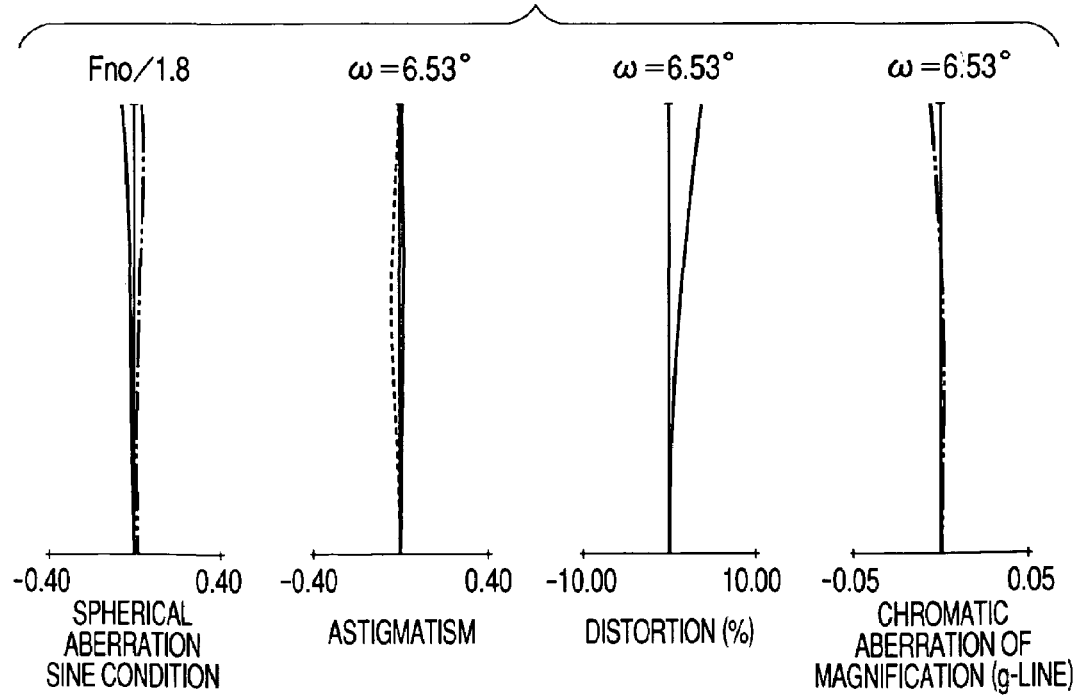
FIG. 9 is a longitudinal aberration diagram in the case of f=48 mm and the object distance of 3.0 m according to the first numerical embodiment.
Figure 10:
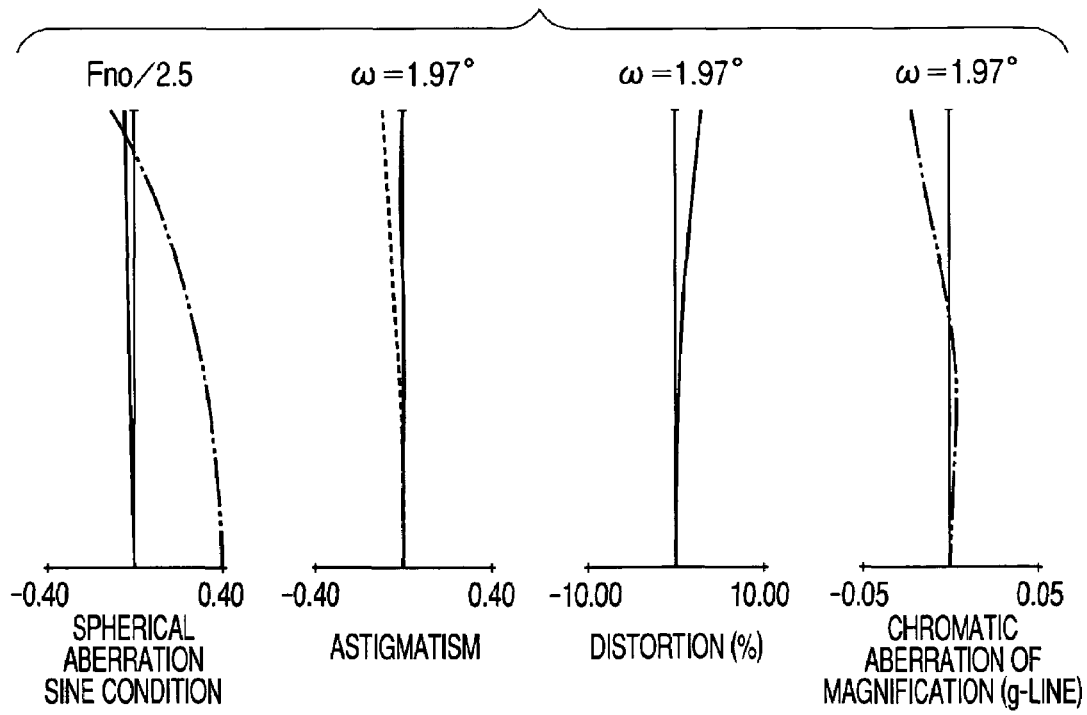
FIG. 10 is a longitudinal aberration diagram in the case of f=160 mm and the object distance of 3.0 m according to the first numerical embodiment.

FIG. 8 is a longitudinal aberration diagram in the case of f=8.0 mm and an object distance of 3.0 m according to the first numerical embodiment, FIG. 9 is a longitudinal aberration diagram in the case of f=48 mm and the object distance of 3.0 m according to the first numerical embodiment, and FIG. 10 is a longitudinal aberration diagram in the case of f=160 mm and the object distance of 3.0 m according to the first numerical embodiment.

[First Numerical Embodiment]

f = 8.0 to 160
Fno. = 1.8 to 2.5
2ω = 69.0°

| | | | | | | | |
|---|---|---|---|---|---|---|---|
| r 1 = | 23.760 | D 1 = | 14.46 | n 1 = | 1.83945 | ν 1 = | 42.7 |
| r 2 = | 11.498 | D 2 = | 17.98 | | | | |
| r 3 = | −22.949 | D 3 = | 4.77 | n 2 = | 1.81264 | ν 2 = | 25.4 |
| r 4 = | −125.374 | D 4 = | 35.94 | | | | |
| r 5 = | 558.414 | D 5 = | 9.42 | n 3 = | 1.62286 | ν 3 = | 60.3 |
| r 6 = | −40.910 | D 6 = | 0.15 | | | | |
| r 7 = | −87.814 | D 7 = | 1.50 | n 4 = | 1.88815 | ν 4 = | 40.8 |
| r 8 = | 70.058 | D 8 = | 11.30 | n 5 = | 1.48915 | ν 5 = | 70.2 |
| r 9 = | −48.275 | D 9 = | 0.15 | | | | |
| r 10 = | 97.046 | D10 = | 10.08 | n 6 = | 1.48915 | ν 6 = | 70.2 |
| r 11 = | −52.888 | D11 = | 1.50 | n 7 = | 1.88815 | ν 7 = | 40.8 |
| r 12 = | −79.560 | D12 = | 190.00 | | | | |
| r 13 = | 52.880 | D13 = | 1.50 | n 8 = | 1.88815 | ν 8 = | 40.8 |
| r 14 = | 36.960 | D14 = | 5.59 | n 9 = | 1.49845 | ν 9 = | 81.5 |
| r 15 = | −102.643 | D15 = | 0.31 | | | | |
| r 16 = | 52.969 | D16 = | 4.74 | n10 = | 1.49845 | ν10 = | 81.5 |
| r 17 = | −75.783 | D17 = | 1.50 | n11 = | 1.88815 | ν11 = | 40.8 |
| r 18 = | 91.868 | D18 = | 2.43 | | | | |
| r 19 = | 34.436 | D19 = | 4.37 | n12 = | 1.62286 | ν12 = | 60.3 |
| r 20 = | 230.073 | | | | | | |

*d12 Image rotator insertion interval

[Second Embodiment]

Figure 5:
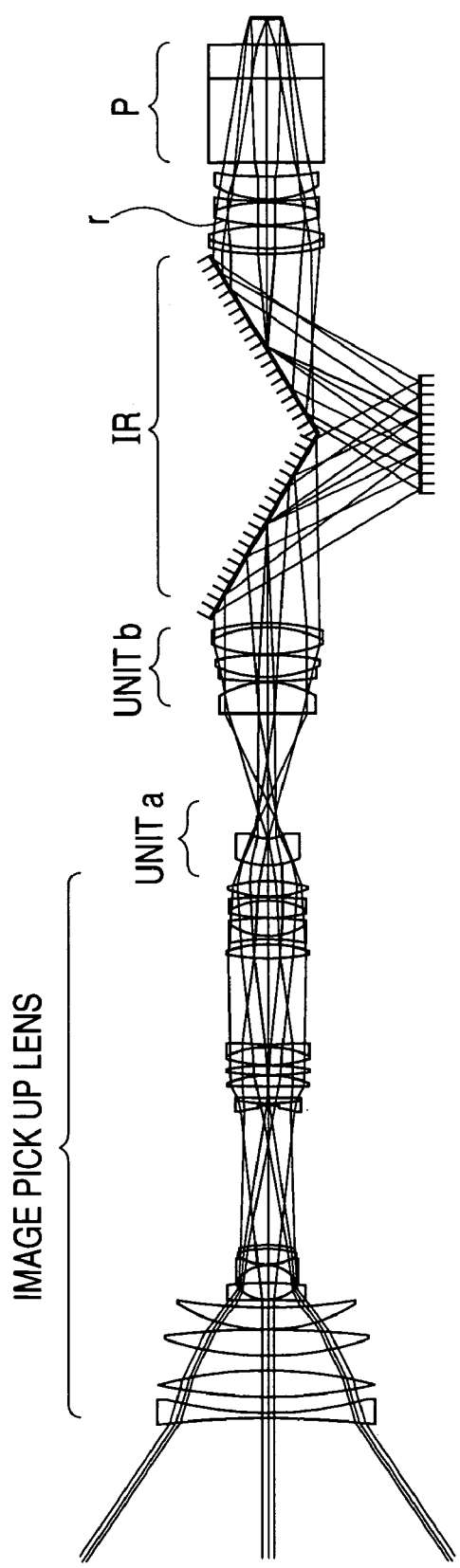
FIG. 5 shows optical paths in the state where an optical system having an image rotating mechanism is mounted to an image pick up lens according to a second embodiment of the present invention.

FIG. 5 shows optical paths in the state where an optical system having an image rotating mechanism is mounted to an image pick up lens according to a second embodiment of the present invention.

In FIG. 5, a lens unit a having a negative optical power is disposed between the image pick up lens and a first imaging plane. A lens unit b having a positive optical power is disposed on the image side with respect to the first imaging plane, and an image rotator IR composed of mirror reflection surfaces is disposed on the image side with respect to the lens unit b. In this embodiment, the image rotator is composed of three mirrors corresponding to the minimum number for making an incident optical axis and an emission optical axis coaxial to each other, but may be composed of odd-numbered surfaces equal to or more than three surfaces. Symbol r denotes an imaging lens having a function of reimaging an image relayed from the image pick up lens. A relationship between the respective conditional expressions described above and various values in numerical embodiments will be shown in Table 2. An interval between the image pick up lens and the optical system having the image rotating function is 5.83 mm. A second numerical embodiment of this embodiment will be shown below.

Figure 11:
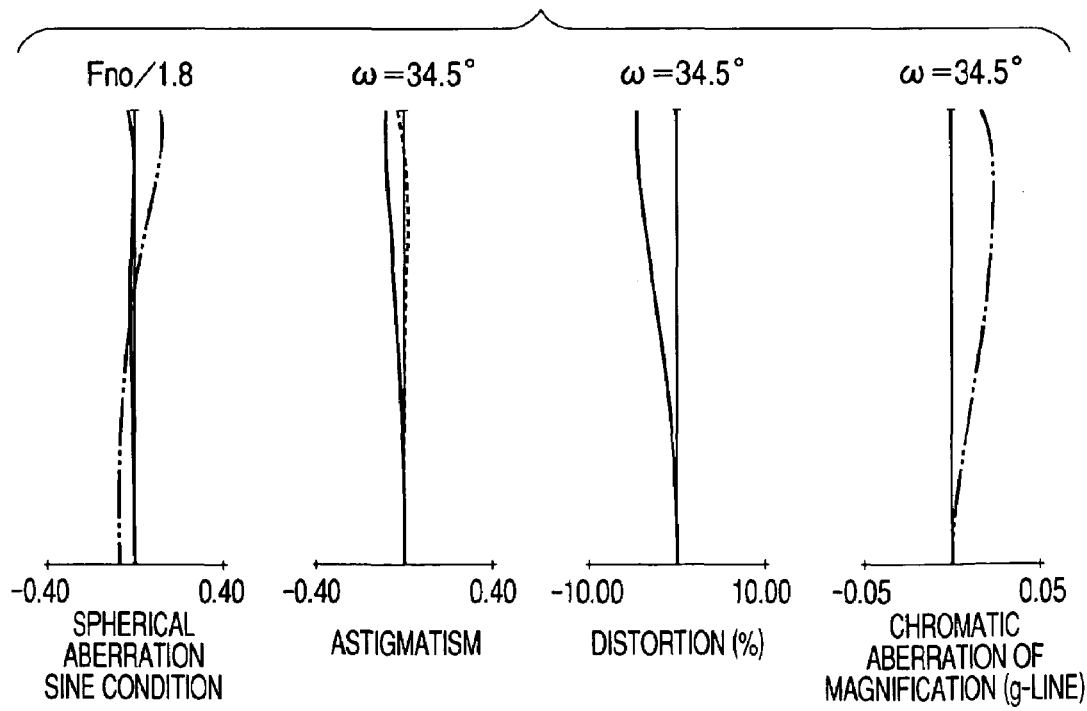
FIG. 11 is a longitudinal aberration diagram in the case of f=8.0 mm and an object distance of 3.0 m according to a second numerical embodiment.

FIG. 11 is a longitudinal aberration diagram in the case of f=8.0 mm and an object distance of 3.0 m according to the second numerical embodiment, FIG. 12 is a longitudinal aberration diagram in the case of f=48 mm and the object distance of 3.0 m according to the second numerical embodiment, and FIG. 13 is a longitudinal aberration diagram in the case of f=160 mm and the object distance of 3.0 m according to the second numerical embodiment.

[Second Numerical Embodiment]

f = 8.0 to 160
Fno. = 1.8 to 2.5
2ω = 69.0°

| | | | | | | | |
|---|---|---|---|---|---|---|---|
| r 1 = | 14.820 | D 1 = | 10.60 | n 1 = | 1.83945 | ν 1 = | 42.7 |
| r 2 = | 9.302 | D 2 = | 49.64 | | | | |
| r 3 = | 271.624 | D 3 = | 11.60 | n 2 = | 1.62286 | ν 2 = | 60.3 |
| r 4 = | −33.357 | D 4 = | 0.74 | | | | |
| r 5 = | −353.878 | D 5 = | 1.50 | n 3 = | 1.88815 | ν 3 = | 40.8 |
| r 6 = | 40.324 | D 6 = | 7.99 | n 4 = | 1.48915 | ν 4 = | 70.2 |
| r 7 = | −90.093 | D 7 = | 0.15 | | | | |
| r 8 = | 50.536 | D 8 = | 10.55 | n 5 = | 1.48915 | ν 5 = | 70.2 |
| r 9 = | −45.480 | D 9 = | 1.50 | n 6 = | 1.88815 | ν 6 = | 40.8 |
| r 10 = | −80.451 | D10 = | 180.03 | | | | |
| r 11 = | 116.195 | D11 = | 1.50 | n 7 = | 1.88815 | ν 7 = | 40.8 |
| r 12 = | 53.330 | D12 = | 8.96 | n 8 = | 1.49845 | ν 8 = | 81.5 |
| r 13 = | 58.530 | D13 = | 0.35 | | | | |
| r 14 = | 71.883 | D14 = | 7.75 | n 9 = | 1.49845 | ν 9 = | 81.5 |
| r 15 = | −59.937 | D15 = | 1.50 | n10 = | 1.88815 | ν10 = | 40.8 |
| r 16 = | 386.910 | D16 = | 0.92 | | | | |
| r 17 = | 34.047 | D17 = | 8.64 | n11 = | 1.62286 | ν11 = | 60.3 |
| r 18 = | 60.008 | | | | | | |

*d10 Image rotator insertion interval

[Third Embodiment]

Figure 6:
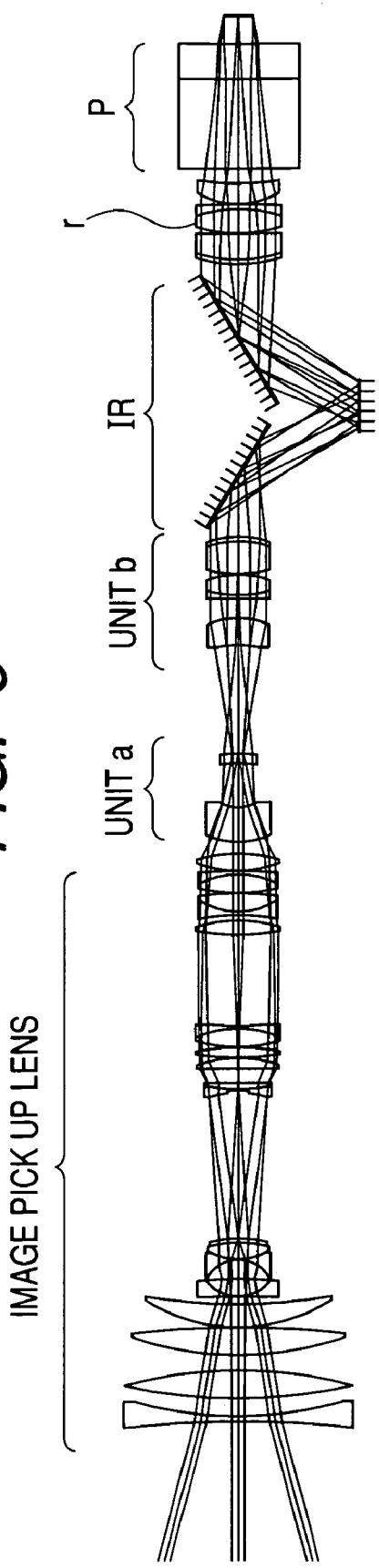
FIG. 6 shows optical paths in the state where an optical system having an image rotating mechanism is mounted to an image pick up lens according to a third embodiment of the present invention.

FIG. 6 shows optical paths in the state where an optical system having an image rotating mechanism is mounted to an image pick up lens according to a third embodiment of the present invention.

In FIG. 6, a lens unit a having a negative optical power is disposed between the image pick up lens and a first imaging plane. A lens unit b having a positive optical power is disposed on the image side with respect to the first imaging plane, and an image rotator IR composed of mirror reflection surfaces is disposed on the image side with respect to the lens unit b. In this embodiment, the image rotator is composed of three mirrors corresponding to the minimum number for making an incident optical axis and an emission optical axis coaxial to each other, but may be composed of odd-numbered surfaces equal to or more than three surfaces. Symbol r denotes an imaging lens having a function of reimaging an image relayed from the image pick up lens. A relationship between the respective conditional expressions described above and various values in numerical embodiments will be shown in Table 2. An interval between the image pick up lens and the optical system having the image rotating function is 4.21 mm. A third numerical embodiment of this embodiment will be shown below.

Figure 14:
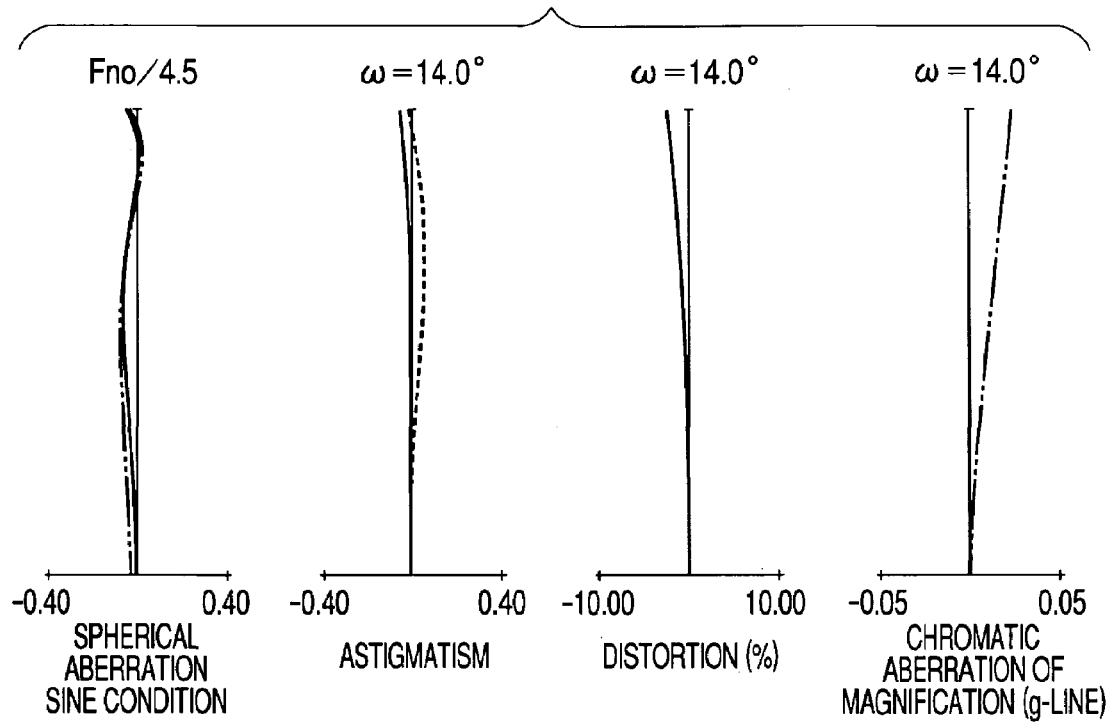
FIG. 14 is a longitudinal aberration diagram in the case of f=20 mm and an object distance of 3.0 m according to a third numerical embodiment.
Figure 15:
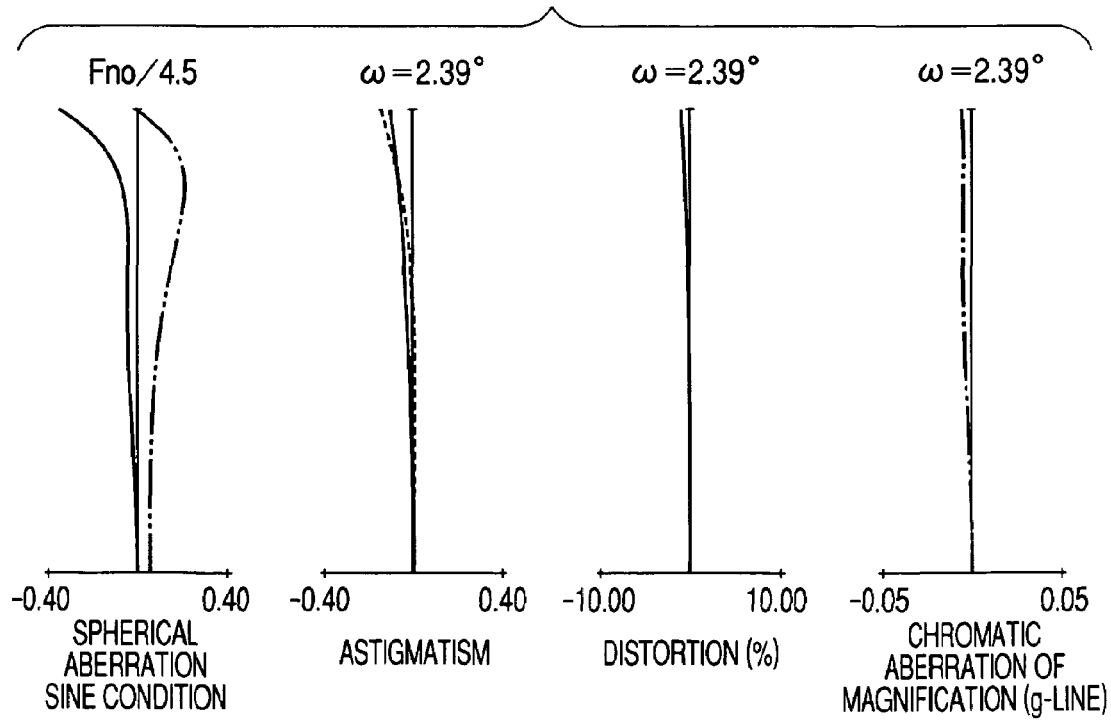
FIG. 15 is a longitudinal aberration diagram in the case of f=120 mm and the object distance of 3.0 m according to the third numerical embodiment.
Figure 16:
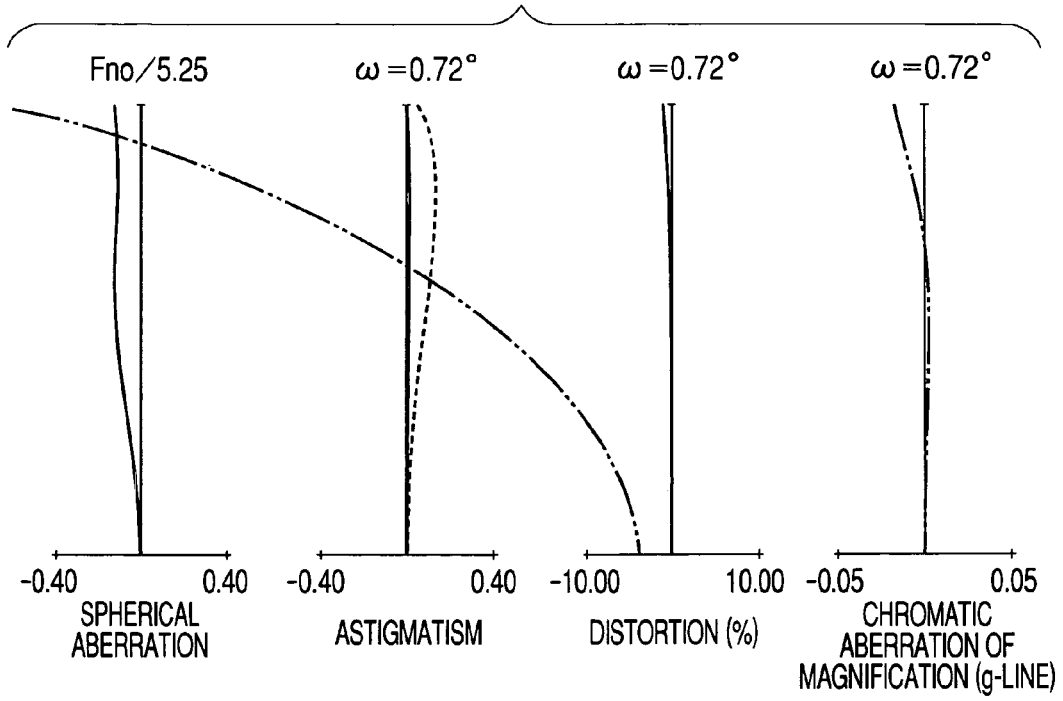
FIG. 16 is a longitudinal aberration diagram in the case of f=400 mm and the object distance of 3.0 m according to the third numerical embodiment.

FIG. 14 is a longitudinal aberration diagram in the case of f=20 mm and an object distance of 3.0 m according to the third numerical embodiment, FIG. 15 is a longitudinal aberration diagram in the case of f=120 mm and the object distance of 3.0 m according to the third numerical embodiment, and FIG. 16 is a longitudinal aberration diagram in the case of f=400 mm and the object distance of 3.0 m according to the third numerical embodiment.

[Third Numerical Embodiment]

f = 20.0 to 400
FNO. = 4.5 to 5.25
2ω = 28.1°

| | | | | | | | |
|---|---|---|---|---|---|---|---|
| r 1 = | 22.359 | d 1 = | 13.29 | n 1 = | 1.88815 | ν 1 = | 40.8 |
| r 2 = | 9.711 | d 2 = | 16.36 | | | | |
| r 3 = | −11.537 | d 3 = | 3.35 | n 2 = | 1.81264 | ν 2 = | 25.4 |
| r 4 = | 11.897 | d 4 = | 38.63 | | | | |
| r 5 = | 58.556 | d 5 = | 10.63 | n 3 = | 1.60520 | ν 3 = | 65.4 |
| r 6 = | −22.778 | d 6 = | 7.27 | | | | |
| r 7 = | −136.289 | d 7 = | 1.50 | n 4 = | 1.88815 | ν 4 = | 40.8 |
| r 8 = | 42.780 | d 8 = | 7.23 | n 5 = | 1.43985 | ν 5 = | 95.0 |
| r 9 = | −28.255 | d 9 = | 0.70 | | | | |
| r 10 = | 130.105 | d10 = | 11.29 | n 6 = | 1.43985 | ν 6 = | 95.0 |
| r 11 = | −24.482 | d11 = | 1.50 | n 7 = | 1.88815 | ν 7 = | 40.8 |
| r 12 = | −36.170 | d12 = | 149.80 | | | | |
| r 13 = | 53.572 | d13 = | 1.50 | n 8 = | 1.88815 | ν 8 = | 40.8 |
| r 14 = | 43.102 | d14 = | 9.55 | n 9 = | 1.43985 | ν 9 = | 95.0 |
| r 15 = | −379.819 | d15 = | 0.65 | | | | |
| r 16 = | 80.254 | d16 = | 8.40 | n10 = | 1.43985 | ν10 = | 95.0 |
| r 17 = | −45.173 | d17 = | 1.50 | n11 = | 1.88815 | ν11 = | 40.8 |
| r 18 = | −528.155 | d18 = | 0.57 | | | | |
| r 19 = | 29.023 | d19 = | 6.93 | n12 = | 1.60520 | ν12 = | 65.4 |
| r 20 = | 62.774 | | | | | | |

*d12 Image rotator insertion interval

TABLE 2

| Conditional Expression | Numerical Embodiment | | |
|---|---|---|---|
| | 1 | 2 | 3 |
| $\phi_a$ | −0.0464 | −0.0042 | −0.0151 |
| $\phi_b$ | 0.0186 | 0.0208 | 0.0241 |
| $|\phi_b/\phi_a|$ | 0.4 | 5.0 | 1.6 |
| $\beta_r$ | −1.0 | −1.0 | −2.5 |

[Fourth Embodiment]

Figure 7:
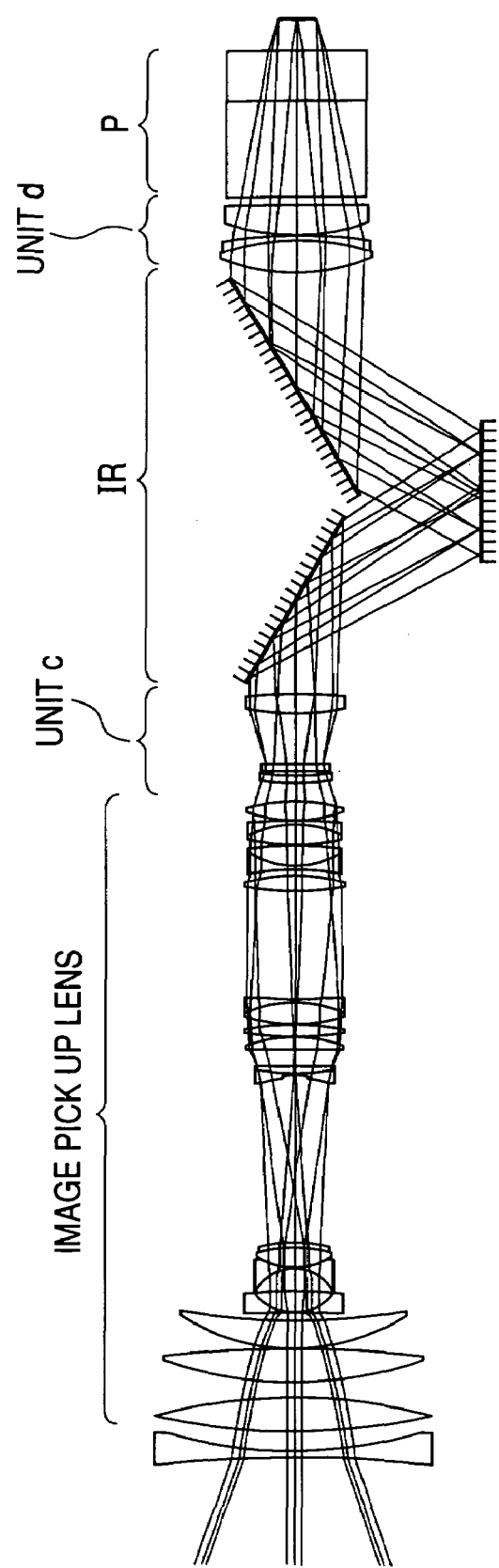
FIG. 7 shows optical paths in the state where an optical system having an image rotating mechanism is mounted to an image pick up lens according to a fourth embodiment of the present invention.

FIG. 7 shows optical paths in the state where an optical system having an image rotating mechanism is mounted to an image pick up lens according to a fourth embodiment of the present invention.

In FIG. 7, a lens unit c having a negative optical power is disposed on the image side with respect to the image pick up lens, and an image rotator IR is disposed on the image side with respect to the lens unit c. In this embodiment, the image rotator is composed of three mirrors corresponding to the minimum number for making an incident optical axis and an emission optical axis coaxial to each other, but may be composed of odd-numbered surfaces equal to or more than three surfaces. Then, a lens unit d having a positive power is disposed, which guides a ray to an imaging plane. An interval between the image pick up lens and the optical system having the image rotating function is 5.67. A fourth numerical embodiment of this embodiment will be shown below. In addition, a relationship between the respective conditional expressions and various values in the fourth numerical embodiment is shown in Table 3.

Figure 17:
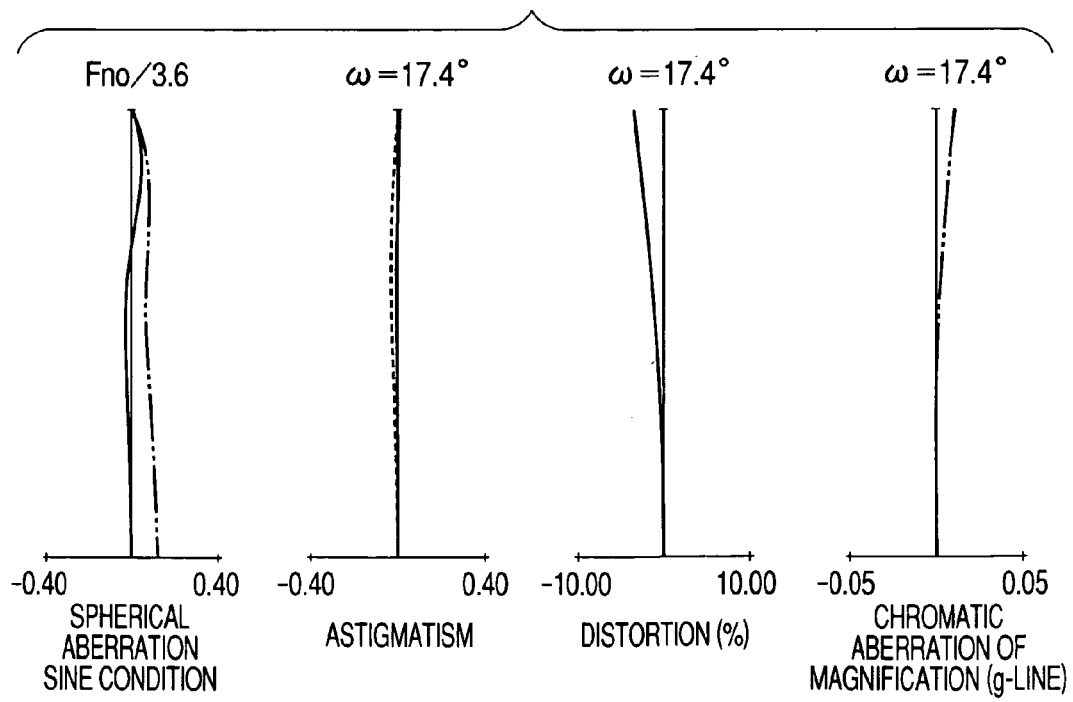
FIG. 17 is a longitudinal aberration diagram in the case of f=16 mm and an object distance of 3.0 m according to a fourth numerical embodiment.
Figure 18:
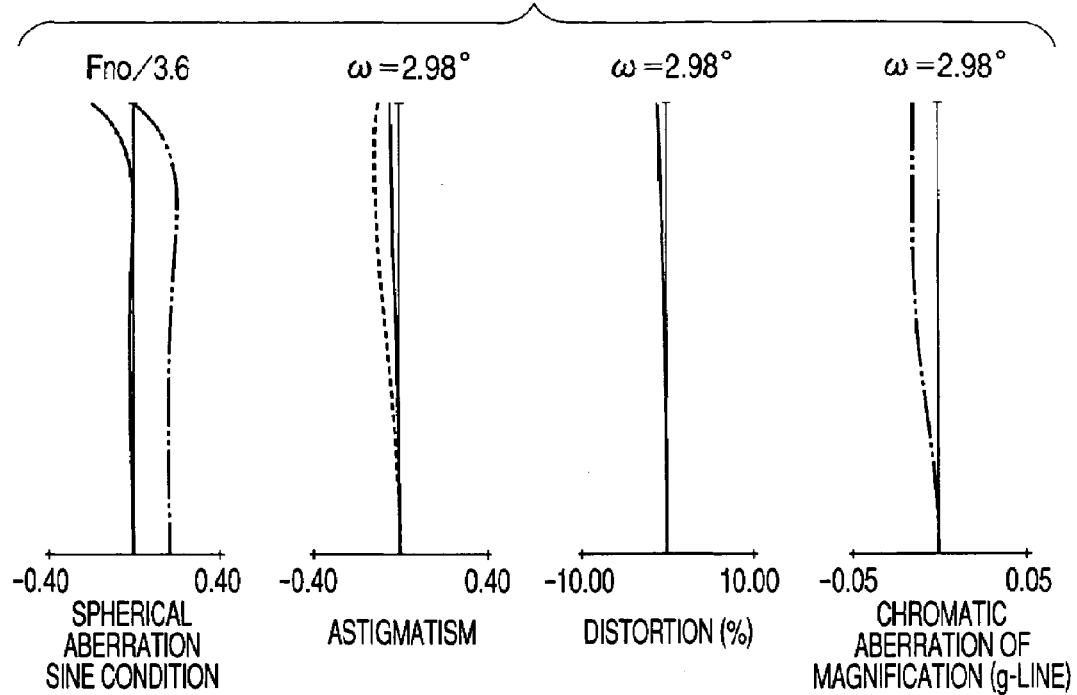
FIG. 18 is a longitudinal aberration diagram in the case of f=96 mm and the object distance of 3.0 m according to the fourth numerical embodiment.
Figure 19:
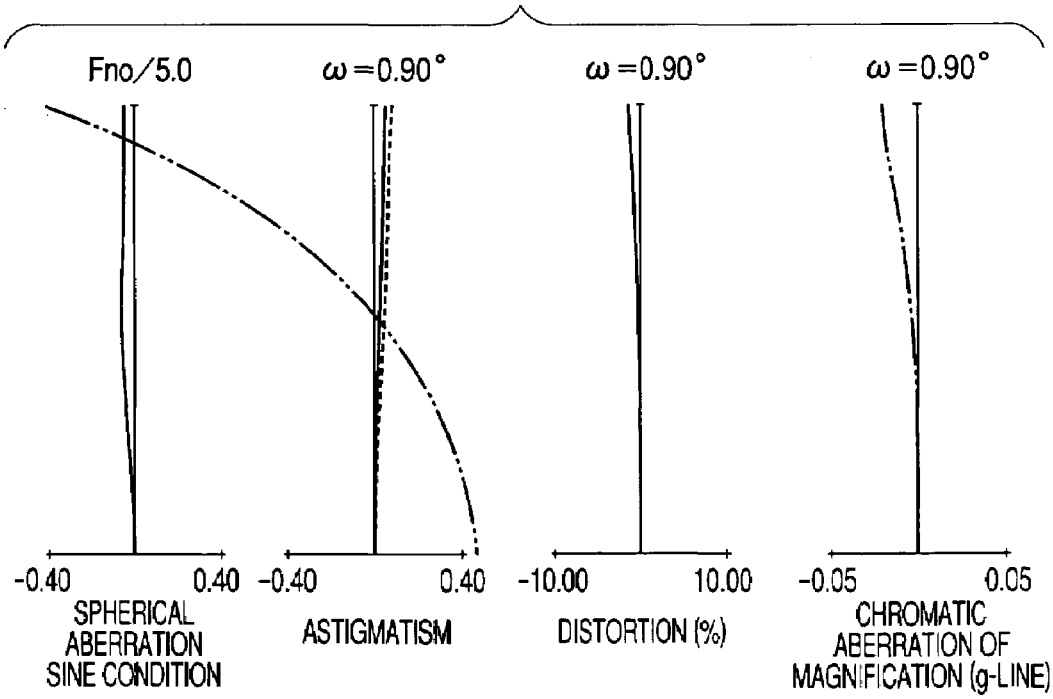
FIG. 19 is a longitudinal aberration diagram in the case of f=320 mm and the object distance of 3.0 m according to the fourth numerical embodiment.
Figure 20:
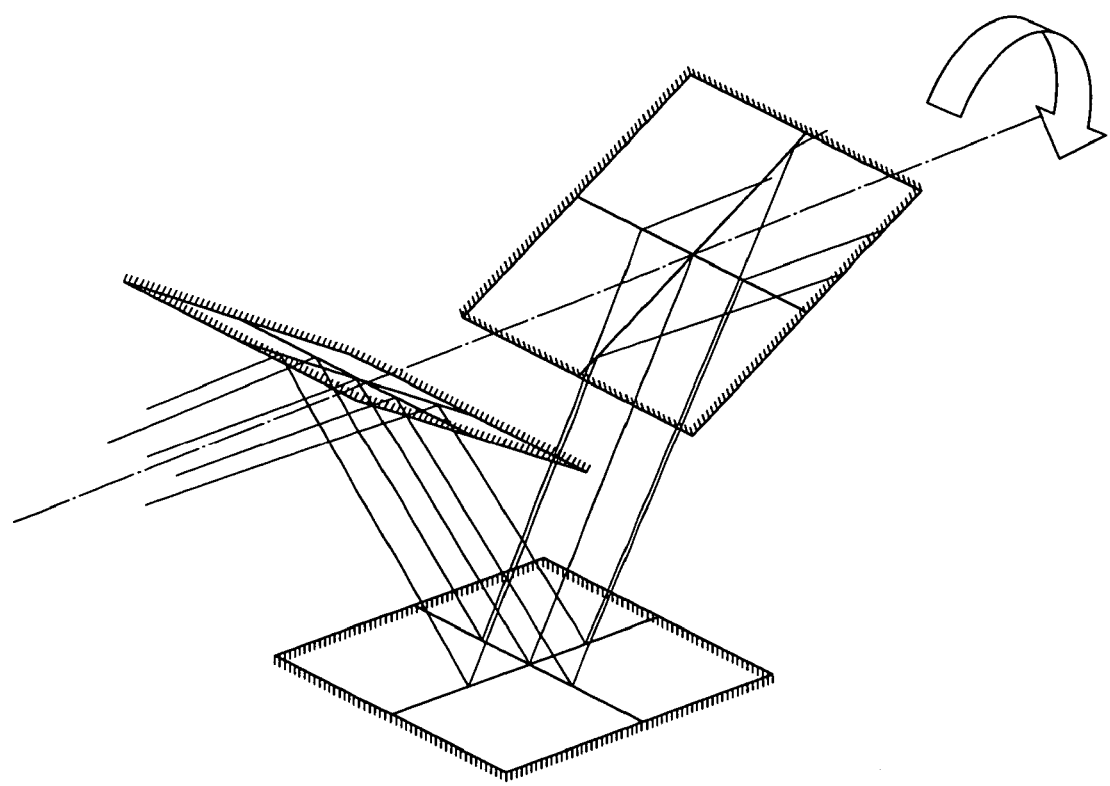
FIG. 20 is a conceptual diagram of an image rotator.

FIG. 17 is a longitudinal aberration diagram in the case of f=16 mm and an object distance of 3.0 m according to a fourth numerical embodiment, FIG. 18 is a longitudinal aberration diagram in the case of f=96 mm and the object distance of 3.0 m according to the fourth numerical embodiment, FIG. 19 is a longitudinal aberration diagram in the case of f=320 mm and the object distance of 3.0 m according to the fourth numerical embodiment.

[Fourth Numerical Embodiment]

f = 16.0 to 320
FNO. = 3.6 to 5.0
2ω = 34.7°

| | | | | | | | |
|---|---|---|---|---|---|---|---|
| r 1 = | 113.457 | d 1 = | 1.50 | n 1 = | 1.88815 | ν 1 = | 40.8 |
| r 2 = | 30.501 | d 2 = | 3.00 | | | | |
| r 3 = | −123.675 | d 3 = | 1.50 | n 2 = | 1.88815 | ν 2 = | 40.8 |
| r 4 = | 71.229 | d 4 = | 17.00 | | | | |
| r 5 = | 198.863 | d 5 = | 24.99 | n 3 = | 1.81264 | ν 3 = | 25.4 |
| r 6 = | −88.050 | d 6 = | 155.00 | | | | |
| r 7 = | 294.052 | d 7 = | 10.10 | n 4 = | 1.48915 | ν 4 = | 70.2 |
| r 8 = | −42.722 | d 8 = | 1.50 | n 5 = | 1.81264 | ν 5 = | 25.4 |
| r 9 = | −86.047 | d 9 = | 0.50 | | | | |
| r 10 = | 71.102 | d10 = | 8.79 | n 6 = | 1.48915 | ν 6 = | 70.2 |
| r 11 = | −93.460 | d11 = | 2.00 | | | | |

*d6 Image rotator insertion interval

TABLE 3

| Conditional Expression | Fourth Numerical Embodiment |
|---|---|
| $\phi_c$ | −0.0197 |
| $\phi_d$ | 0.0157 |
| $|\phi_d/\phi_c|$ | 0.8 |
| $\beta_s$ | 2.0 |

According to the present invention, in the optical system having the image rotating function disposed on an image side with respect to an image pick up lens, which makes it possible that its optical performance is satisfactory, an eclipse amount is small, a field angle and an F number intended by a photographer are satisfied, and compactness is achieved.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2004-073751 filed Mar. 16, 2004, which is hereby incorporated by reference herein.

What is claimed is:

1. An optical system mountable to an image pick up lens, comprising:
   an image rotator which is disposed on an image side with respect to a first imaging plane of the image pick up lens and has an incident optical axis and an emission optical axis made coaxial to each other;
   a first lens unit having a negative optical power which is disposed between the image pick up lens and the first imaging plane;

a second lens unit having a positive optical power which is disposed between the first imaging plane and the image rotator; and a third lens unit having a positive optical power which is disposed on the image side with respect to the image rotator, wherein the following conditional expressions (1) and (2) are satisfied:

$$0.3 < |\Phi_b/\Phi_a| < 5.5 \quad (1),$$

$$-0.3 < \beta_r < -0.9 \quad (2),$$

where $\Phi_a$ represents an optical power of the first lens unit, $\Phi_b$ represents an optical power of the second lens unit, and $\beta_r$ represents an imaging magnification of the entire optical system.

2. An optical system mountable to an image pick up lens, comprising:

an image rotator which is disposed on an image side with respect to the image pick up lens and has an incident optical axis and an emission optical axis made coaxial to each other;

a first lens unit having a negative optical power which is disposed between the image pick up lens and the image rotator; and a second lens unit having a positive optical power which is disposed on the image side with respect to the image rotator, wherein the following conditional expressions (3) and (4) are satisfied:

$$0.75 < |\Phi_d/\Phi_c| < 1.2 \quad (1),$$

$$1.2 < \beta_s < 3.0 \quad (2),$$

where $\Phi_c$ represents an optical power of the first lens unit, $\Phi_d$ represents an optical power of the second lens unit, and $\beta_s$ represents an imaging magnification of the entire optical system.

3. An optical system according to claim 1, wherein the image rotator comprises mirror reflection surfaces.

4. An optical system according to claim 2, wherein the image rotator comprises mirror reflection surfaces.

5. An optical apparatus, comprising:

an image pick up lens;

an image pick up camera; and the optical system according to claim 1 which is disposed between the image pick up lens and the image pick up camera.

6. An optical apparatus, comprising:

an image pick up lens;

an image pick up camera; and the optical system according to claim 2 which is disposed between the image pick up lens and the image pick up camera.

* * * * *